(12) United States Patent (10) Patent No.: US 8,332,634 B2
Derouet (45) Date of Patent: Dec. 11, 2012

(54) CRYPTOGRAPHIC SYSTEMS FOR ENCRYPTING INPUT DATA USING AN ADDRESS ASSOCIATED WITH THE INPUT DATA, ERROR DETECTION CIRCUITS, AND METHODS OF OPERATING THE SAME

(75) Inventor: Odile Derouet, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1348 days.

(21) Appl. No.: 11/785,281

(22) Filed: Apr. 16, 2007

(65) Prior Publication Data

US 2007/0286413 A1 Dec. 13, 2007

(30) Foreign Application Priority Data

Jun. 7, 2006 (KR) .................. 10-2006-0051033

(51) Int. Cl.
*G06F 21/00* (2006.01)
(52) U.S. Cl. .......................... 713/162; 380/28
(58) Field of Classification Search .................. 713/162, 713/193; 380/28, 29, 37; 714/819, 820; 327/64, 327, 107; 365/189.07; 345/561
See application file for complete search history.

(56) References Cited

U.S. PATENT DOCUMENTS

| | | | |
|---|---|---|---|
| 4,168,396 A | 9/1979 | Best | |
| 4,772,845 A * | 9/1988 | Scott | 324/66 |
| 5,132,685 A * | 7/1992 | DeWitt et al. | 341/120 |
| 5,166,977 A | 11/1992 | Ross | |
| 5,276,690 A * | 1/1994 | Lee et al. | 714/703 |
| 5,357,467 A | 10/1994 | Hayashi | |
| 5,377,343 A | 12/1994 | Yaezawa | |
| 5,696,777 A * | 12/1997 | Hofsaess | 714/820 |
| 5,896,337 A * | 4/1999 | Derner | 365/220 |
| 5,909,374 A * | 6/1999 | Matsunaga | 716/103 |
| 6,049,229 A * | 4/2000 | Manohar et al. | 326/83 |
| 6,061,449 A * | 5/2000 | Candelore et al. | 380/28 |
| 6,134,631 A | 10/2000 | Jennings, III | |
| 6,438,678 B1 | 8/2002 | Cashman et al. | |
| 6,700,827 B2 | 3/2004 | Lien et al. | |
| 6,769,053 B1 | 7/2004 | De Jong et al. | |
| 6,943,638 B1 * | 9/2005 | Li | 331/144 |
| 7,092,400 B2 | 8/2006 | Malzahn | |
| 7,451,288 B2 * | 11/2008 | Goettfert et al. | 711/164 |
| 2001/0013112 A1 * | 8/2001 | Shoyama | 716/1 |
| 2002/0109616 A1 * | 8/2002 | Boudry | 341/58 |
| 2002/0146019 A1 * | 10/2002 | Malzahn | 370/402 |

(Continued)

FOREIGN PATENT DOCUMENTS

DE 103 45 378 A1 5/2005

(Continued)

OTHER PUBLICATIONS

Takahashi et al., "On Diagnosing Multiple Stuck-at Faults Using Multiple and Single Fault Simulation in Combinational Circuits", IEEE Transactions on Computer-Aided Design of Integrated Circuits and Systems, vol. 21, No. 3, Mar. 2002, pp. 362-368.*

(Continued)

*Primary Examiner* — Hadi Armouche
(74) *Attorney, Agent, or Firm* — Myers Bigel Sibley & Sajovec P.A.

(57) ABSTRACT

A cryptographic system includes encryption logic that is configured to encrypt input data by performing a mask operation on the input data using an address associated with the input data.

13 Claims, 9 Drawing Sheets

U.S. PATENT DOCUMENTS

| | | | |
|---|---|---|---|
| 2002/0166058 A1* | 11/2002 | Fueki | 713/194 |
| 2004/0148512 A1* | 7/2004 | Park et al. | 713/193 |
| 2004/0202331 A1* | 10/2004 | Derouet | 380/281 |
| 2005/0154912 A1* | 7/2005 | Kim et al. | 713/200 |
| 2006/0008079 A1 | 1/2006 | Daemen et al. | |
| 2007/0008008 A1* | 1/2007 | Kwack et al. | 326/87 |
| 2007/0019805 A1 | 1/2007 | Karpovsky et al. | |
| 2007/0171754 A1* | 7/2007 | Nam et al. | 365/230.03 |

FOREIGN PATENT DOCUMENTS

| | | |
|---|---|---|
| EP | 0 908 810 A2 | 4/1999 |
| EP | 1 571 522 A1 | 9/2005 |
| KR | 10-2000-0075917 A | 12/2000 |
| KR | 10-2001-0032591 A | 4/2001 |
| KR | 10-2002-0085753 A | 11/2002 |
| KR | 1020020085753 A | 11/2002 |
| KR | 10-2003-0055745 A | 7/2003 |
| KR | 2003-0070095 | 8/2003 |
| WO | WO 02/056592 | 7/2002 |
| WO | WO 03/030441 A2 | 4/2003 |
| WO | WO 03/030441 A3 | 4/2003 |
| WO | WO 03/092219 A1 | 11/2003 |
| WO | WO 2004/006074 A2 | 1/2004 |
| WO | WO 2005/091550 A1 | 9/2005 |

OTHER PUBLICATIONS

Notice of Allowance for corresponding Korean Application No. 2006-51033; mailed May 30, 2008.

Notice to File a Response/Amendment to the Examination Report in Korean Patent Application No. 2006-51033; Aug. 23, 2007.

English translation of Notice to File a Response/Amendment to the Examination Report in Korean Patent Application No. 2006-51033; Aug. 23, 2007.

United Kingdom Search Report for British Application No. GB0710989.5; Sep. 18, 2007.

German Office Action dated Jun. 24, 2010, Corresponding German Patent Application No. 10 2007 026 977.5-31, 5 pages.

* cited by examiner

| i     | 0  | 1  | 2  | 3 | 4  | 5  | 6  | 7 | 8  | 9  | 10 | 11 | 12 | 13 | 14 | 15 |
|-------|----|----|----|---|----|----|----|---|----|----|----|----|----|----|----|----|
| S1(i) | 14 | 4  | 13 | 1 | 2  | 15 | 11 | 8 | 3  | 10 | 6  | 12 | 5  | 9  | 0  | 7  |
| S2(i) | 0  | 15 | 7  | 4 | 14 | 2  | 13 | 1 | 10 | 6  | 12 | 11 | 9  | 5  | 3  | 8  |

CRYPTOGRAPHIC SYSTEMS FOR ENCRYPTING INPUT DATA USING AN ADDRESS ASSOCIATED WITH THE INPUT DATA, ERROR DETECTION CIRCUITS, AND METHODS OF OPERATING THE SAME

RELATED APPLICATION

This application claims the benefit of and priority to Korean Patent Application No. 10-2006-0051033, filed Jun. 7, 2006, in the Korean Intellectual Property Office, the disclosure of which is hereby incorporated herein by reference as if set forth in its entirety.

FIELD OF THE INVENTION

The present invention relates generally to integrated circuit devices and methods of operating the same and, more particularly, to cryptographic systems, error detection circuits, and methods of operating the same.

BACKGROUND OF THE INVENTION

A smart card is a plastic card into which an integrated circuit (IC) may be installed, and may be similar to a credit card. Standards for smart card technology have been defined by the International Standards Organization (ISO) and the Joint Technical Committee 1 (JTC1) of the International Electronic Committee (IEC). The International standard series ISO/IEC 7816 defines various characteristics of smart cards, such as physical properties, physical connections, electronic signals, transmission protocols, commands, security architectures, application identifiers, and general data elements.

Smart cards have been considered for use as multimedia information apparatus as they may provide better data retention than conventional magnetic cards and may provide better security. Smart cards may have the advantage of high security and large data storage capacity, which may be suitable for a wide range of applications. Accordingly, smart cards have been used in applications in various fields, such as finance, distribution, traffic, mobile communication, and other applications.

Figure 1:
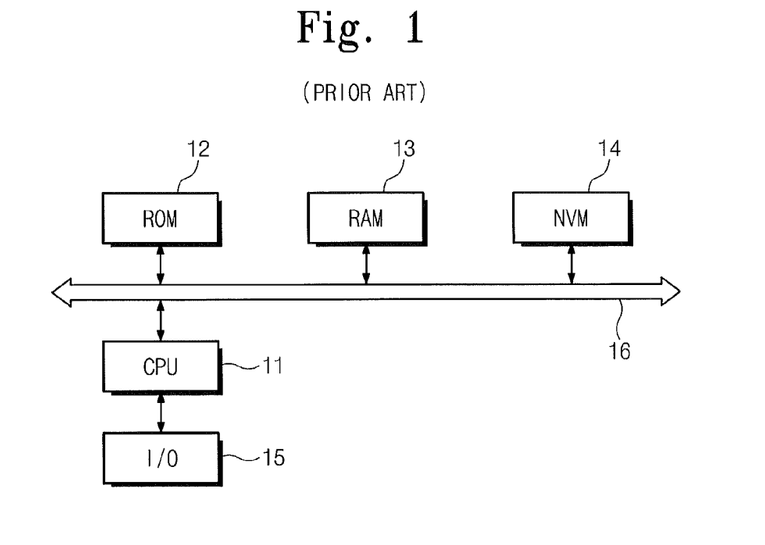
FIG. 1 is a block diagram that illustrates a conventional smart card architecture.

FIG. 1 is a block diagram that illustrates a conventional smart card architecture. The smart card includes a CPU 11, ROM 12, RAM 13, EEPROM 14, I/O module 15, and bus 16 as shown. The CPU 11 may be configured to control overall data processing and arithmetic operations. The ROM 12 may be configured to store the operating system, boot code, and the initialization program. The RAM 13 may be used to store modifiable program(s) and/or temporary data. The EEPROM 14 may be used to store one or more application programs. The I/O module 15 may be used to allow the CPU 11 to communicate with an external device. The CPU 11, ROM 12, RAM 13, and EEPROM 14 are coupled by a bus 16. The bus 16 may include both a data bus and an address bus. The data bus may carry electrical signals between the CPU 11, ROM 12, RAM 13, and EEPROM 14, along with any other devices that may be connected to the bus 16, for the purpose of transferring data between them. The address bus may connect the CPU 11 to the main memory device(s) to identify particular locations (addresses) in the main memory. The width of the address bus determines how many unique memory locations can be addressed.

In smart card devices, it may be important to protect the confidentiality and integrity of the data carried on the data bus. Likewise, it may also be important to protect the integrity of the addresses carried on the address bus. If the data and/or addresses stored/used in the smart card are not secure, then a user or a system operator may be hesitant to store private or secret information in a smart card. Unauthorized access to a smart card is sometimes called "tempering." Tempering techniques include invasive attacks using microprobes and non-invasive attacks using software tools. Non-invasive attacks can involve performing a side channel analysis that decrypts a key code of a cryptographic algorithm (e.g., DES algorithm) using a pattern of power consumption (or current dissipation) or timing differences due to operations of the smart card. Side channel analysis techniques can be classified as simple power analysis (SPA) and differential power analysis (DPA). DPA and SPA are methods of analyzing a power signal generated by a low power consumption device, such as a smart card, in the course of calculations (or operations) to discover secret information stored in the smart card when the block cipher algorithm is applied to the smart card. DPA and SPA can be carried out based on the attacker estimating a specific bit of a cipher text after one round, which corresponds to a plaintext if the plaintext is known. One countermeasure to DPA and SPA is to prevent the attacker from knowing the plaintext in the course of calculations carried out inside the smart card.

Various countermeasures against DPA and SPA have been proposed. The countermeasures include hardware methods and software methods. The hardware methods include generating a noise power, randomizing an operation sequence, and/or filtering a power signal. The software methods include masking techniques in which a random number is generated inside a smart card and the random number is exclusive-OR'd with plaintext to make the plaintext be seen as a random number, thereby disabling power analysis.

SUMMARY

According to some embodiments of the present invention, a cryptographic system includes encryption logic that is configured to encrypt input data by performing a mask operation on the input data using an address associated with the input data.

In other embodiments of the present invention, the encryption logic includes a first logic circuit and a second logic circuit. The first logic circuit is configured to perform a first mask operation on the input data using at least a portion of an address so as to generate a first output. The second logic circuit is configured to perform a second mask operation on the first output using a key to generate a second output.

In still other embodiments of the present invention, each of the first and second mask operations includes an exclusive OR operation, an addition operation, a subtraction operation, a multiplication operation, and/or a division operation. The addition, subtraction, multiplication, and division operations are performed with respect to a modulus.

In still other embodiments of the present invention, an S-box circuit is configured to transform the second output. A permutation circuit is configured to permute the transformed second output so as to generate the encrypted input data.

In still other embodiments of the present invention, the permutation circuit is configured to perform a linear function on the transform second output.

In still other embodiments of the present invention, the linear function is a shift function or linear transformation of bits of the second output.

In still other embodiments of the present invention, the input data includes at least a byte of data. The S-box circuit comprises a first S-box circuit and a second S-box circuit that are configured to transform a first nibble of the second output and a second nibble of the second output, respectively.

In still other embodiments of the present invention, the cryptographic system includes a processing unit. The encryption logic includes a cryptographic co-processor that is communicatively coupled to the processing unit. The cryptographic co-processor receives the input data from the processing unit.

In still other embodiments of the present invention, the encryption logic is integrated with the processing unit so as to form a single logical unit.

In still other embodiments of the present invention, the encryption logic includes a first round logic circuit that is configured to generate a first round logic circuit output responsive to the input data, at least a portion of an address, and a first key. A first round S-box circuit is configured to transform the first round logic circuit output. A first round permutation circuit is configured to permute the transformed first round logic circuit output so as to generate a first round output. A second round logic circuit is configured to generate a second round logic circuit output responsive to the first round output, at least a second portion of the address, and a second key. A second round S-box circuit is configured to transform the second round logic circuit output. A second round permutation circuit is configured to permute the transformed second round logic circuit output so as to generate the encrypted input data.

According to further embodiments of the present invention, an error detection circuit includes a first logic circuit that is configured to perform a logic operation on input information and a first pattern so as to generate a first output. A second logic circuit is configured to perform a logic operation on the input information and a second pattern so as to generate a second output. A third logic circuit is configured to perform a logic operation on the first output and the second output to generate a third output. A detector circuit is configured to compare the third output with a value that corresponds to a logical combination of the first pattern with the second pattern, and to recognize an error if the value does not equal the third output.

In further embodiments of the present invention, the first logic circuit is configured to perform a mask operation, the second logic circuit is configured to perform the mask operation, and the third logic circuit is configured to perform the mask operation.

In still further embodiments of the present invention, the mask operation includes an exclusive OR operation, an addition operation, a subtraction operation, a multiplication operation, and/or a division operation. The addition, subtraction, multiplication, and division operations are performed with respect to a modulus.

In still further embodiments of the present invention, the error detection circuit includes a first bus that couples the first logic circuit to the third logic circuit. A second bus couples the second logic circuit to the third logic circuit.

In still further embodiments of the present invention, the input information includes input data.

In still further embodiments of the present invention, the input information includes an input address.

In still further embodiments of the present invention, a fourth logic circuit is configured to perform a mask operation on the first output and the first pattern to obtain the input information.

According to other embodiments of the present invention, a cryptographic system includes a first encryption circuit that is configured to generate, responsive to input data, a first output that corresponds to encrypted input data having a mask operation performed thereon using a first pattern. A second encryption circuit is configured to generate, responsive to the input data, a second output that corresponds to the encrypted input data having the mask operation performed thereon using a second pattern. A detector input logic circuit is configured to perform the mask operation on the first output and the second output to generate a third output. A detector circuit is configured to compare the third output with a value that corresponds to the first pattern having the mask operation performed thereon using the second pattern. An error is recognized if the value does not equal the third output.

In still other embodiments of the present invention, the first encryption circuit includes encryption logic that is configured to encrypt the input data by performing the mask operation on the input data using an address associated with the input data.

In still other embodiments of the present invention, the encryption logic includes a first logic circuit that is configured to perform the mask operation on the input data using the first pattern so as to generate a first logic circuit output. A second logic circuit is configured to perform the mask operation on the first logic circuit output using at least a portion of the address so as to generate a second logic circuit output. A third logic circuit is configured to perform the mask operation on the second logic circuit output using a key to generate a third logic circuit output.

In still other embodiments of the present invention, the mask operation includes an exclusive OR operation, an addition operation, a subtraction operation, a multiplication operation, and/or a division operation. The addition, subtraction, multiplication, and division operations are performed with respect to a modulus.

In still other embodiments of the present invention, an S'-box circuit is configured to transform the third logic circuit output. A permutation circuit is configured to permute the transformed third logic circuit output so as to generate the first output corresponding to the encrypted input data having the mask operation performed thereon using the first pattern.

In still other embodiments of the present invention, the S'-box circuit satisfies the following equation:

$$S'(D\ XOR\ M1\ XOR\ A\ XOR\ K) = S(D\ XOR\ A\ XOR\ K)\ XOR\ P{-}1(M1);$$

where D is the input data, M1 is the first pattern, A is the at least a portion of the address, K is the key, P−1 is an inverse of the permutation performed by the permutation circuit, S'( ) is the S'-box transformation function, and S( ) is another S-box transformation used in a decryption operation.

Although described above primarily with respect to system and/or circuit embodiments of the present invention, it will be understood that the present invention can be embodied as a system, circuit, method, and/or computer program product.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the present invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements. As used herein, the term "and/or" and "/" includes any and all combinations of one or more of the associated listed items. Like numbers refer to like elements throughout the description.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that although the terms first and second are used herein to describe various components, circuits, regions, layers and/or sections, these components, circuits, regions, layers and/or sections should not be limited by these terms. These terms are only used to distinguish one component, circuit, region, layer or section from another component, circuit, region, layer or section. Thus, a first component, circuit, region, layer or section discussed below could be termed a second component, circuit, region, layer or section, and similarly, a second component, circuit, region, layer or section may be termed a first component, circuit, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments of the present invention stem from a realization that a smart card, for example, can include a cryptographic system that can be used to encrypt data using an address associated with the input data to protect against tampering attacks such as those discussed above. A smart card may include an error detection circuit in which various logic operations are performed on the data carried on a data bus and/or the address carried on an address bus to determine if the data and/or the address information have been corrupted.

Some embodiments of the present invention are described herein in the context of a smart card that includes a cryptographic function and/or an error detection function. It will be understood that embodiments of the present invention are not limited to smart cards and that the cryptographic systems and error detection circuits described herein may be used in other devices or as stand-alone devices.

Figure 2:
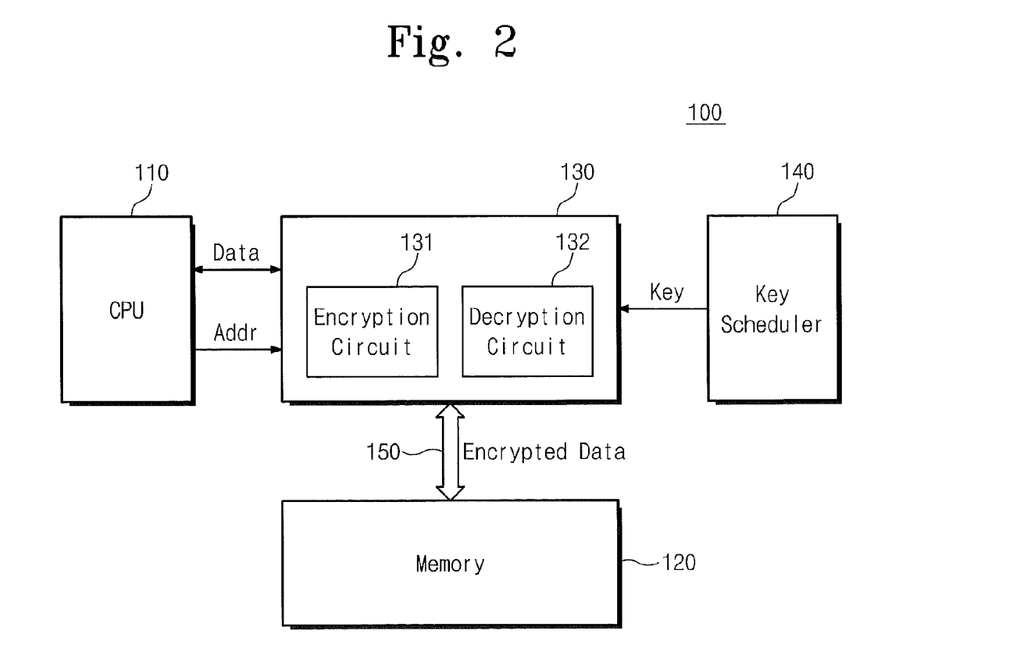
FIG. 2 is a block diagram that illustrates a cryptographic system in accordance with some embodiments of the present invention.

Referring to FIG. 2, a smart card 100, in accordance with some embodiments of the present invention, includes a CPU 110, a cryptographic circuit 130, a key scheduler 140, and a memory 120 that are configured as shown. The cryptographic circuit 130 may be embodied as a co-processor to the CPU 110. The CPU 110 and the cryptographic circuit 130 may communicate data and address information therebetween. The key scheduler 140 may provide a key to the cryptographic circuit 130 that may be used to encrypt and/or decrypt data. In some embodiments, the cryptographic circuit 130 includes an encryption circuit 131 that is used to encrypt data that is carried on the bus 150 connecting the cryptographic circuit 130 and the memory 120 using an address that is associated with the data and/or a key obtained from the key scheduler 140. The cryptographic circuit 130 further includes a decryption circuit 132 that is used to decrypt previously encrypted data.

Figure 3:
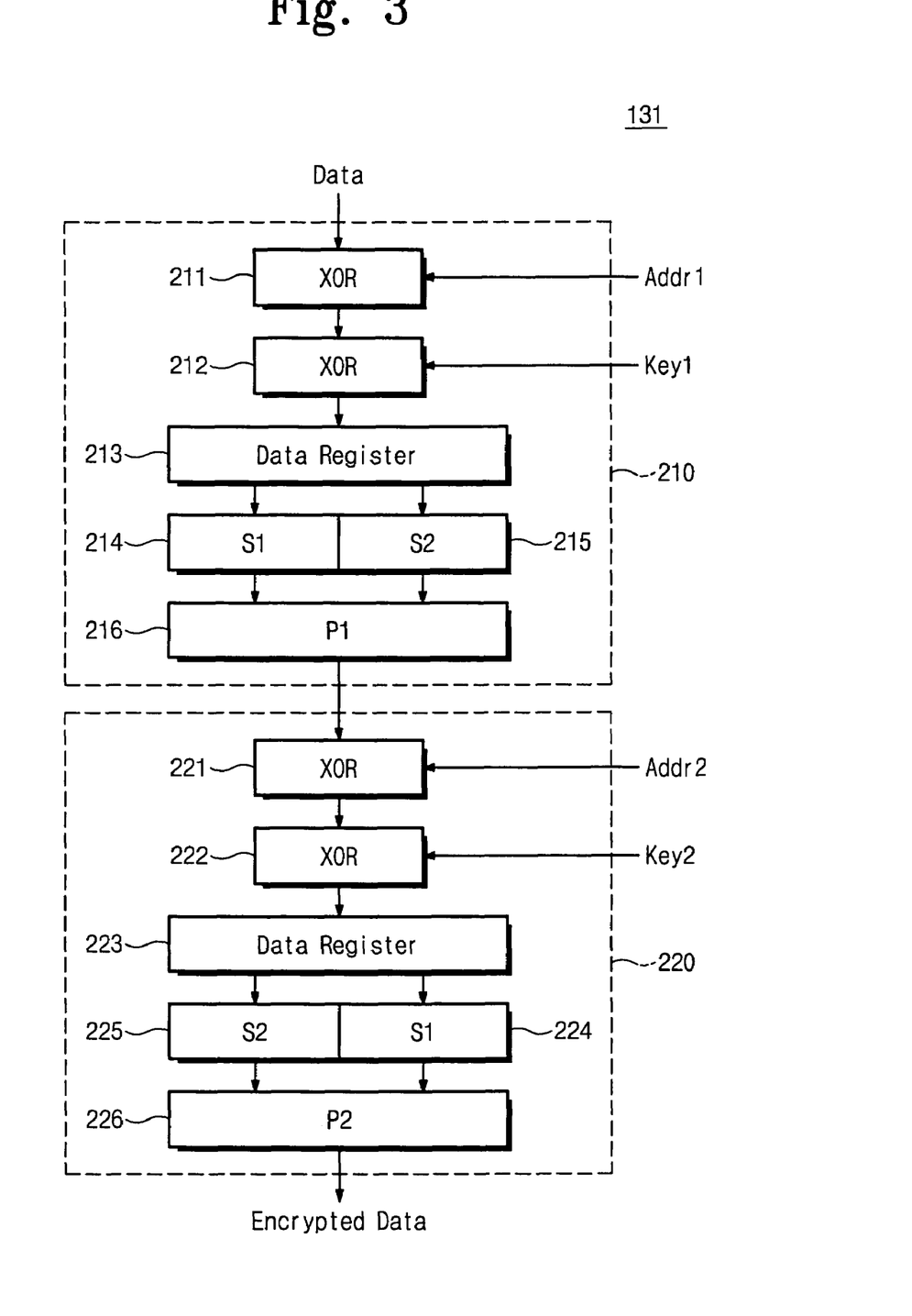
FIG. 3 is a block diagram that illustrates encryption logic circuitry for use in the cryptographic system of FIG. 2, in accordance with some embodiments of the present invention.

FIG. 3 is a block diagram that illustrates encryption logic circuitry that may be used in the encryption circuit 131 of FIG. 2 in accordance with some embodiments of the present invention. The encryption logic circuitry includes a first round logic circuit 210 and a second round logic circuit 220. The first round logic circuit 210 includes XOR logic circuits 211 and 212, a data register 213, S-box circuits 214 and 215, and a permutation circuit 216 that are connected in series. Data to be encrypted is received at an input to the XOR circuit 211 where a mask operation is performed on the data using an address (addr1) associated with the data. The XOR circuit 212 performs a second mask operation on the output of the XOR circuit 211 using a key (key1) obtained form the key scheduler 140. Although an exclusive OR logic operation is illustrated as the mask operations of blocks 211 and 212 in FIG. 3, it will be understood that the mask operation may comprise an exclusive OR operation, an addition operation, a subtraction operation, a multiplication operation, and/or a division operation, in which the addition, subtraction, multiplication, and division operations are performed with respect to a modulus, in accordance with various embodiments of the present invention.

Figure 4:
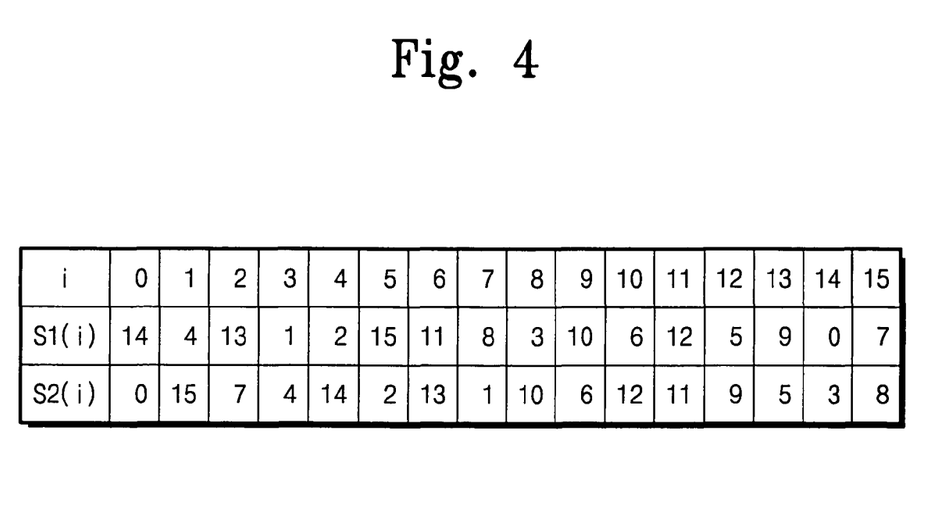
FIG. 4 is an S-box table for use in the encryption logic circuitry of FIG. 3, in accordance with some embodiments of the present invention.

The data register 213 holds the output of the XOR circuit 212 and provides a first portion of the output of the XOR circuit 212 to a first S-box circuit (S1) 214 and a second portion of the output of the XOR circuit 212 to a second S-box circuit (S2) 215. An S-box is short for substitution box and is commonly used in cryptographic systems. In particular, S-boxes may be used to obscure the relationship between plaintext and cipher text. In operation, an S-box make take some number of input bits, m, and transform those input bits into some number of output bits, n, using, for example, a lookup table. FIG. 4 is an exemplary S-box table that may be used to implement S-box circuits 214 and 215. For example, if the input data is one byte having the value data=1001 1010, addr1=0111 0011, and key1=1100 0101, then the value stored in the data register is 0010 1100. The input to S1 214 is 0010 and the input to S2 215 is 1100. Referring to the table of FIG. 5, S1(2)=13=1101 and S2(12)=9=1001. The input to the permutation circuit 216 is, therefore, 1101 1001.

In accordance with some embodiments of the present invention, the permutation circuit 216 is configured to perform a linear function on its input. In accordance with various embodiments of the present invention, the linear function may be a shift function or a linear transformation of bits. In the example shown in FIG. 3, the permutation circuit 216 may be configured to perform a shift operation such that P1(1101 1001)=1011 0011.

The second round logic circuit 220 includes XOR logic circuits 221 and 222, a data register 223, S-box circuits 224 and 225, and a permutation circuit 226 that are connected in series. Operations of the second round logic circuit 220 are similar to those discussed above with respect to the first round logic circuit 210 with the exception that a second address (addr2) and a second key (key2) are used in the mask operations performed by the XOR logic circuits 221 and 222, respectively, instead of the first address (addr1) and the first key (key1). Also, in the second round logic circuit 220, the S-box circuit S1 operates on the lower nibble instead of the upper nibble and S-box circuit S2 operates on the upper nibble instead of the lower nibble.

The encrypted data that is output from the second round logic circuit 220 may be very difficult to decode. As a result, tempering attacks, such as those discussed above, on a smart card may not be successful in obtaining confidential data used in the smart card that has been encrypted in accordance with various embodiments of the present invention.

Figure 5:
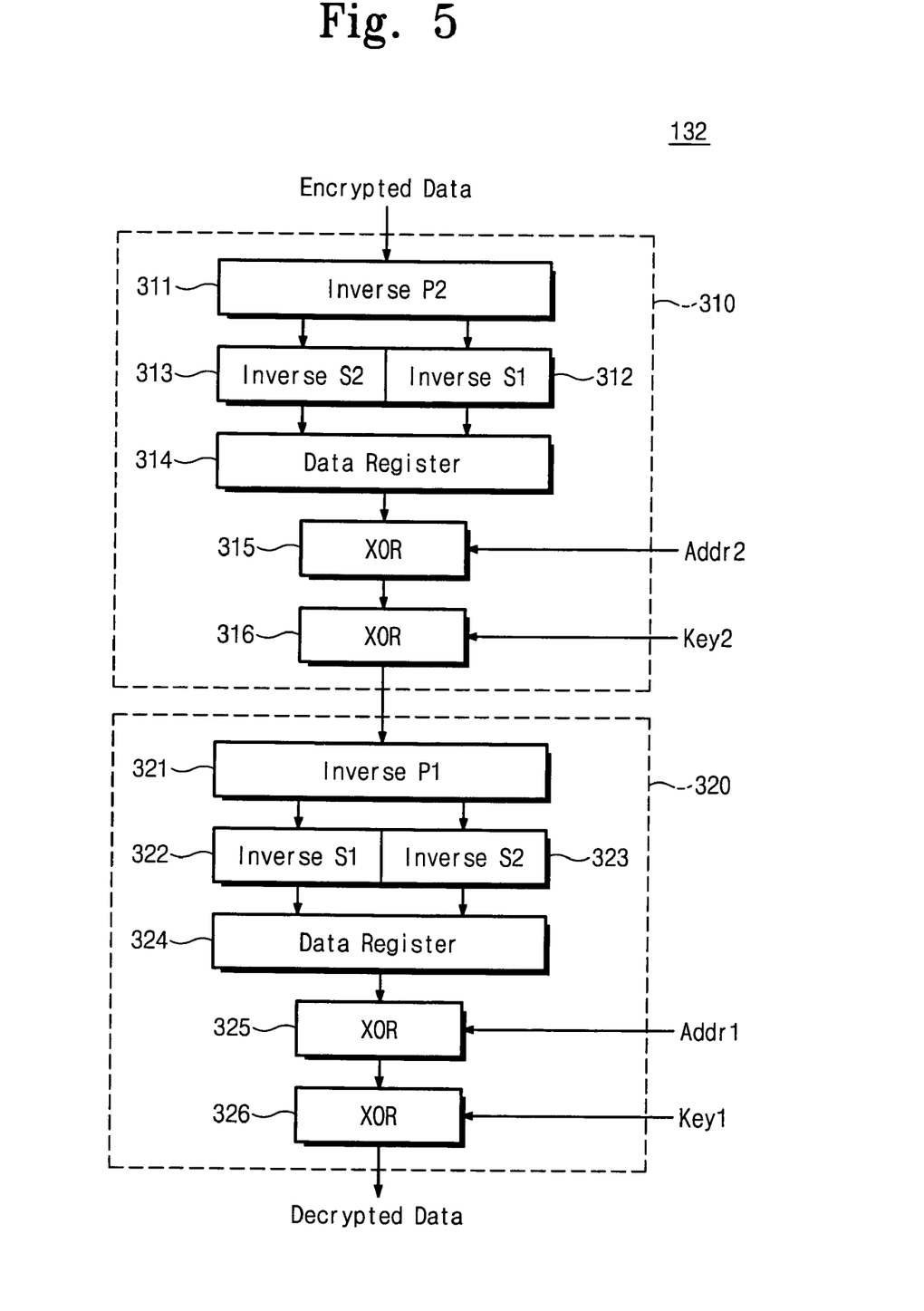
FIG. 5 is a block diagram that illustrates decryption logic circuitry for use in the cryptographic system of FIG. 2, in accordance with some embodiments of the present invention.

FIG. 5 is a block diagram that illustrates decryption logic circuitry that may be used in the decryption circuit 132 of FIG. 2 in accordance with some embodiments of the present invention. The decryption logic circuitry includes a first round logic circuit 310 and a second round logic circuit 320. The first round logic circuit 310 includes an inverse permutation circuit 311, inverse S-box circuits 312 and 313, a data register 314, and XOR logic circuits 315 and 316 connected in series. The first round logic circuit 310 is operable to undo the operations performed by the second round logic circuit 220 of FIG. 3. If the output of the first round logic circuit 210 of FIG. 3 is OP and $\|$ represents a concatenation operation, then the inverse permutation circuit 311 generates an output given by the following equation $P^{-2}$[P2(S2(OP XOR ADDR2 XOR KEY2)$\|$S1(OP XOR ADDR2 XOR K2))]=S2(OP XOR ADDR2 XOR KEY2)$\|$S1(OP XOR ADDR2 XOR K2). The inverse S-box circuits 312 and 313 perform the following operations: $S^{-2}$(S2(OP XOR ADDR2 XOR KEY2))=OP XOR ADDR2 XOR KEY2 and $S^{-1}$(S1(OP XOR ADDR2 XOR KEY2))=OP XOR ADDR2 XOR KEY2. The first XOR logic circuit 315 performs the following operation: OP XOR ADDR2 XOR KEY2 XOR ADDR2=OP XOR KEY2. Finally, the second XOR logic circuit 316 performs the following operation: OP XOR KEY2 XOR KEY2=OP. Thus, the first round logic circuit 310 recovers the output of the first round logic circuit 210 of the encryption circuit 131 at an output thereof.

The second round logic circuit 320 includes an inverse permutation circuit 321, inverse S-box circuits 322 and 323, a data register 324, and XOR logic circuits 325 and 326 connected in series. The second round logic circuit 320 is operable to undo the operations performed by the first round logic circuit 210 of FIG. 3. Operations of the second round logic circuit 320 are similar to those discussed above with respect to the first round logic circuit 310. That is, the second round logic circuit 320 receives at its input the output of the first round logic circuit 210 of the encryption circuit 131 of FIG. 3 and generates the original unencrypted data at its output.

Returning to FIG. 2, the smart card 100 may advantageously transmit encrypted data over the bus 150 to the memory 120 in accordance with the various embodiments described above with respect to FIGS. 3 and 4. The encrypted data may be difficult to decode through power analysis techniques because of the mask operations, S-box operations, and/or the permutation operations performed by the encryption circuitry. Embodiments of the present invention may also be scaled in accordance with the level of protection desired. For example, the encryption and decryption circuitry described above with respect to FIGS. 3-5 incorporate two rounds of encryption/decryption operations. Fewer or more rounds of encryption/decryption operations may be used in accordance with various embodiments of the present invention. In the examples described above with respect to FIGS. 3-5, the input data was one byte. It may be desirable, however, to perform the cryptographic operations described above on other data sizes depending on the bus width. Thus, the operations described above with respect to FIGS. 3-5 may be performed in parallel to support, for example, 16 bit, 32 bit, 64 bit, or other bus widths.

Figure 6:
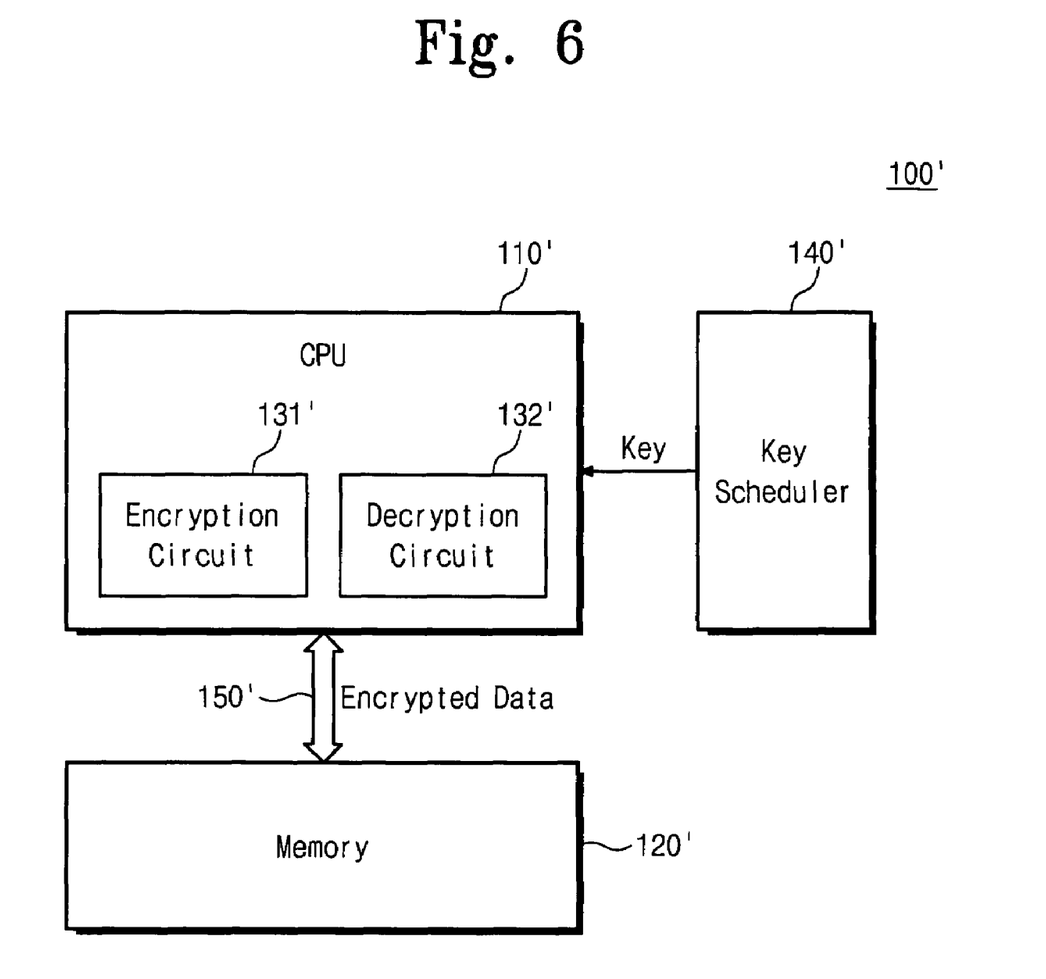
FIG. 6 is a block diagram that illustrates a cryptographic system in accordance with further embodiments of the present invention.

FIG. 6 is a block diagram that illustrates a cryptographic system in accordance with further embodiments of the present invention. Referring to FIG. 6, a smart card 100', in accordance with some embodiments of the present invention, includes a CPU 110', an encryption circuit 131', a decryption circuit 132', a key scheduler 140', and a memory 120' that are configured as shown. The memory 120' is coupled to the CPU 110' by a data bus 150'. Operations of the encryption circuit 131' and the decryption circuit 132' are similar to the operations of the encryption circuit 131 and the decryption circuit 132 of FIG. 2 discussed above. A difference between the smart card 100' of FIG. 6 and the smart card 100 of FIG. 2 is that the encryption logic in the smart card 100' is integrated with the CPU 110' so as to form a single logic unit, whereas the cryptographic circuit 130 of FIG. 2 is configured as a co-processor to the CPU 110 of FIG. 2.

Figure 7:
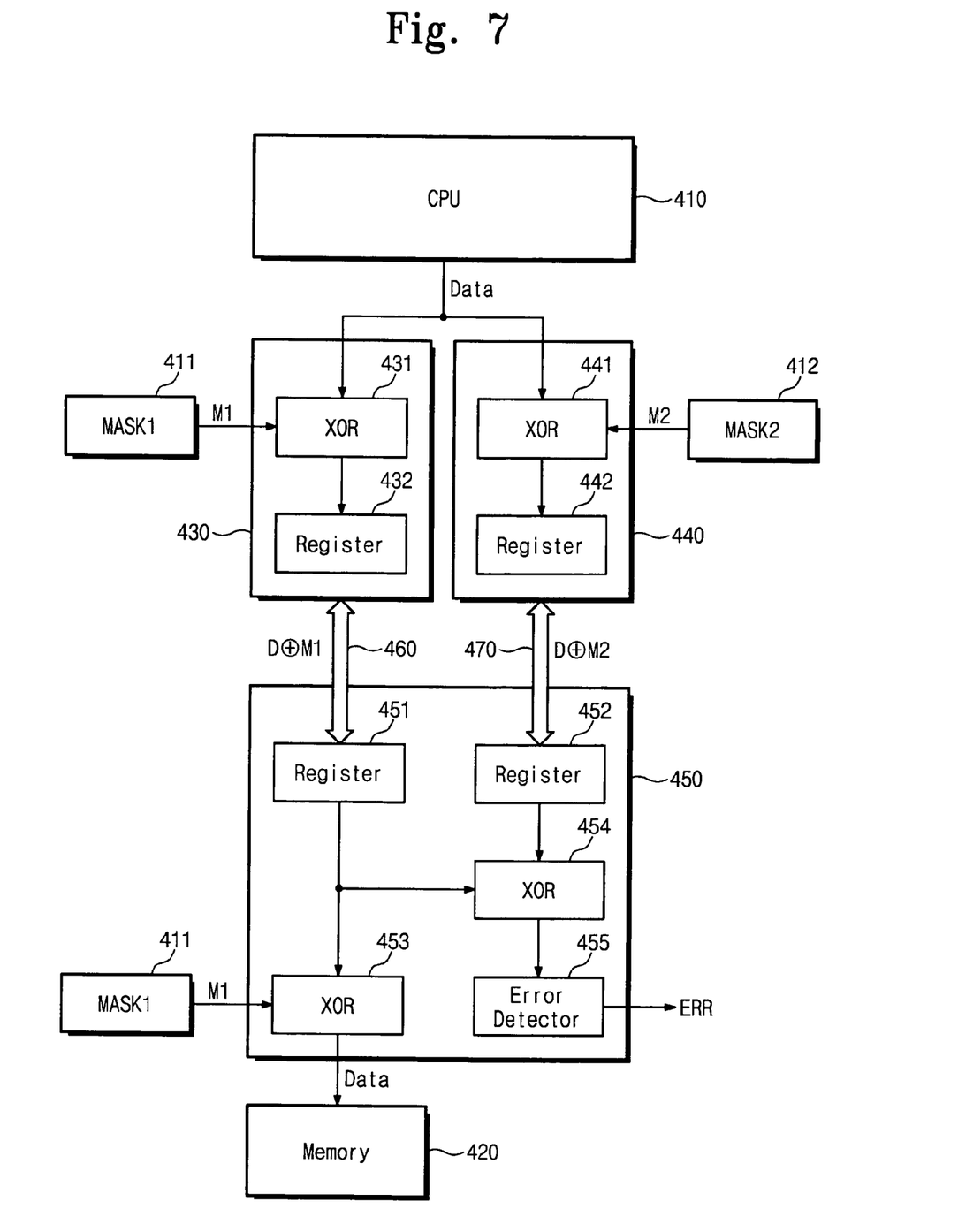
FIG. 7 is a block diagram that illustrates an error detection circuit in accordance with some embodiments of the present invention.

FIG. 7 is a block diagram that illustrates an error detection circuit in accordance with some embodiments of the present invention. Referring to FIG. 7, the error detection circuit includes a CPU 410, three logic circuits 430, 440, and 450, and a memory 420 that are configured as shown. The data bus coupled to the CPU 410 is connected in parallel to the logic circuits 430 and 440. The XOR logic circuit 431 performs a mask operation on the data using a first pattern MASK1 (M1) and stores the output in a register 432. Similarly, the XOR logic circuit 441 performs a mask operation on the data using a second pattern MASK2 (M2) and stores the output in a register 442. Although an exclusive OR logic operation is illustrated as the mask operations of blocks 431 and 441 in FIG. 7, it will be understood that the mask operation may comprise an exclusive OR operation, an addition operation, a subtraction operation, a multiplication operation, and/or a division operation, in which the addition, subtraction, multiplication, and division operations are performed with respect to a modulus, in accordance with various embodiments of the present invention.

The logic circuit 430 provides input data XOR M1 at the output 460 and the logic circuit 440 provides input data XOR M2 at the output 470. These outputs are respectively provided to registers 451 and 452 of the logic circuit 450. The logic circuit 450 further includes XOR logic circuits 453 and 454. The XOR logic circuit 453 is used to recover the original input data by performing a mask operation on the contents of the register 451 using the first pattern MASK1 (M1). The output of the XOR logic circuit 453 is given by the following equation: input data XOR M1 XOR M1=input data. Thus, the input data is stored in the memory 420.

The XOR logic circuit 454 performs a mask operation on the contents of the register 452 using the contents of register 451. The output of the XOR logic circuit 454 is given by the following equation: input data XOR M1 XOR input data XOR M2=M1 XOR M2. An error detector circuit 455 can compare the output of the XOR logic circuit 454 with the known result of M1 XOR M2. If the output of the XOR logic circuit 454 is not M1 XOR M2, then the input data on at least one branch of the dual data bus has been corrupted and an error is recognized.

Figure 8:
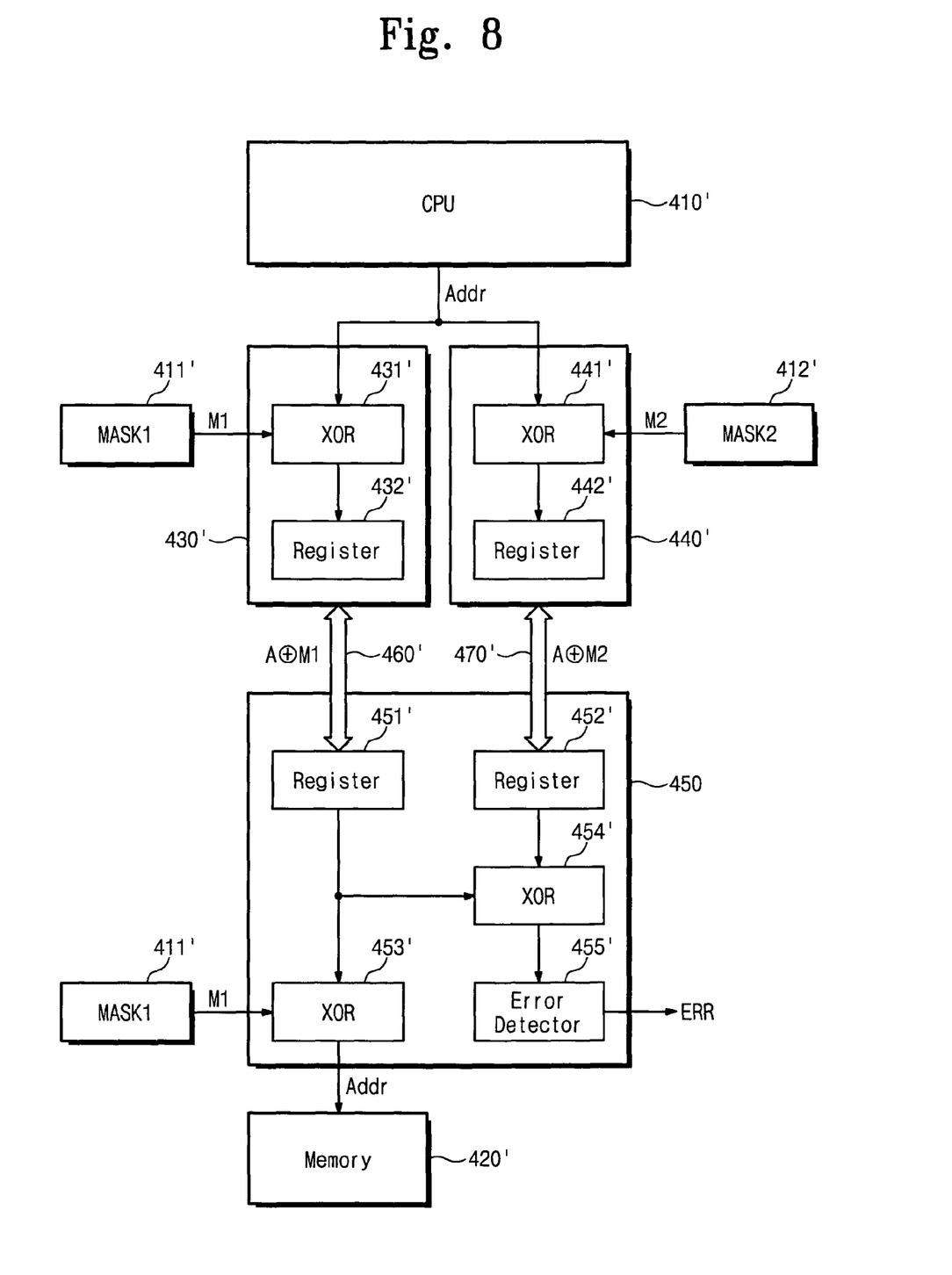
FIG. 8 is a block diagram that illustrates an error detection circuit in accordance with further embodiments of the present invention.

FIG. 8 is a block diagram that illustrates an error detection circuit in accordance with further embodiments of the present invention. The error detection circuit of FIG. 8 includes the same components as the error detection circuit of FIG. 7 with like components being denoted by the same reference numbers, but including a trailing apostrophe at the end of the number. Instead of dual data bus embodiments as illustrated in FIG. 7, however, FIG. 8 illustrates dual address bus embodiments. Operations of the error detection circuit of FIG. 8 are similar to those of the error detection circuit of FIG. 7 with the exception that they are applied to address information carried on a dual address bus.

Figure 9:
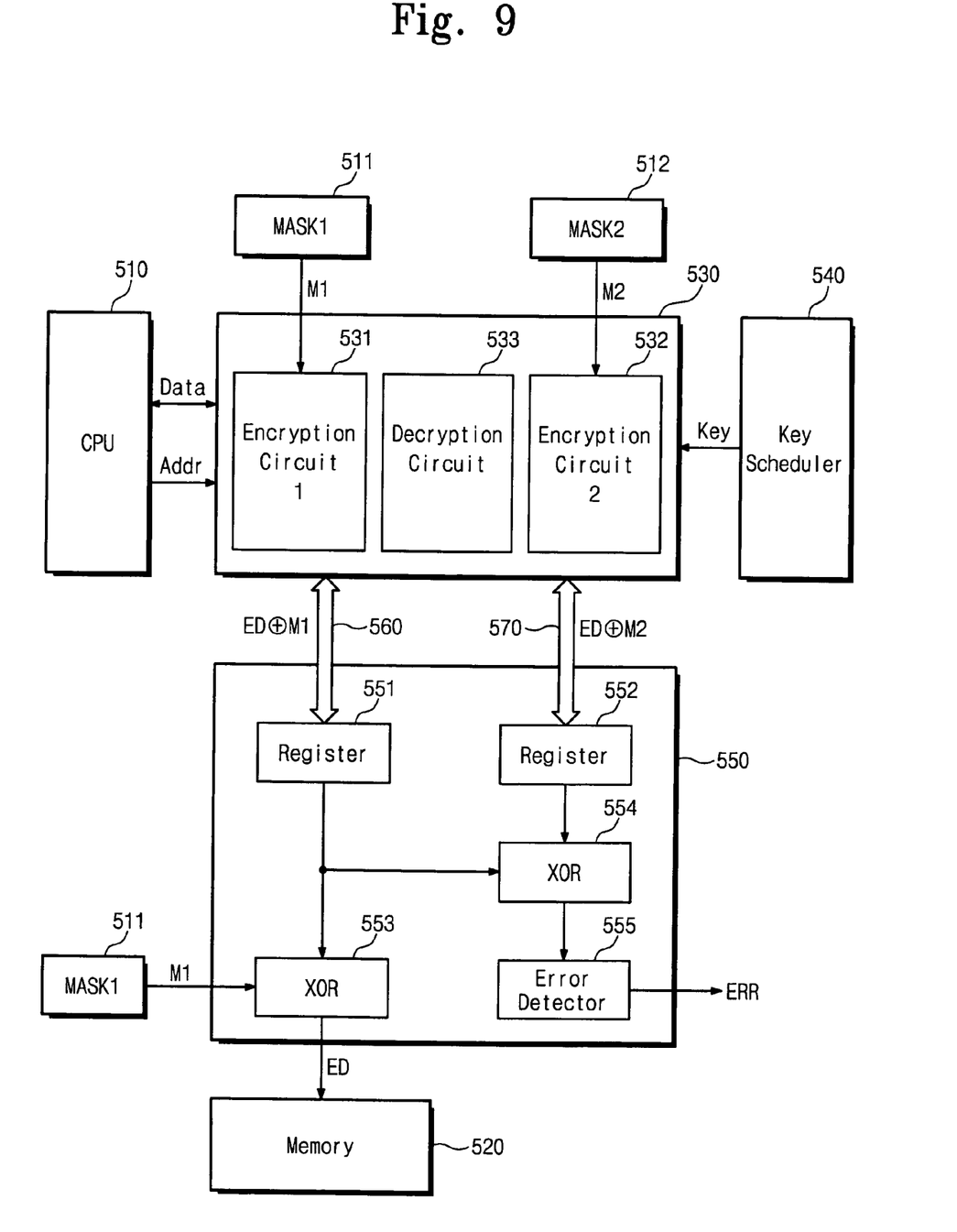
FIG. 9 is a block diagram that illustrates a cryptographic system that includes the error detection circuit of FIG. 7 in accordance with some embodiments of the present invention.

In accordance with further embodiments of the present invention, the cryptographic system embodiments of FIGS. 2-6 may be combined with the error detection circuit embodiments of FIGS. 7 and 8. Referring to FIG. 9, a cryptographic system that includes an error detection circuit, in accordance with some embodiments of the present invention, is illustrated. The cryptographic system of FIG. 9, in accordance with some embodiments of the present invention, includes a CPU 510, a cryptographic circuit 530, a key scheduler 540, an error detection circuit 550, and a memory 520 that are configured as shown. The cryptographic circuit 530 may be embodied as a co-processor to the CPU 510. The CPU 510 and the cryptographic circuit 530 may communicate data and address information therebetween. In other embodiments, the CPU 510 and cryptographic circuit 530 may be embodied in a single logical unit, such as that illustrated in FIG. 6 discussed above. The architecture and operations of the encryption circuits 531 and 532 are substantially similar to the architecture and operations of the encryption circuit 131 of FIG. 2 with the exception being the design of the S-box circuit. Similarly, the architecture and operations of the decryption circuit 533 is substantially similar to the architecture and operations of the decryption circuit 532 of FIG. 2 with the exception being the design of the inverse S-box circuit.

As shown in FIG. 9, the cryptographic circuit 530 generates encrypted data XOR MASK1 (M1) at output 560 and encrypted data XOR MASK2 (M2) at output 570. The architecture and operations of the error detection circuit 550 is the same as the logic circuits 450 and 450' of the error detection circuits of FIGS. 7 and 8, respectively.

Figure 10:
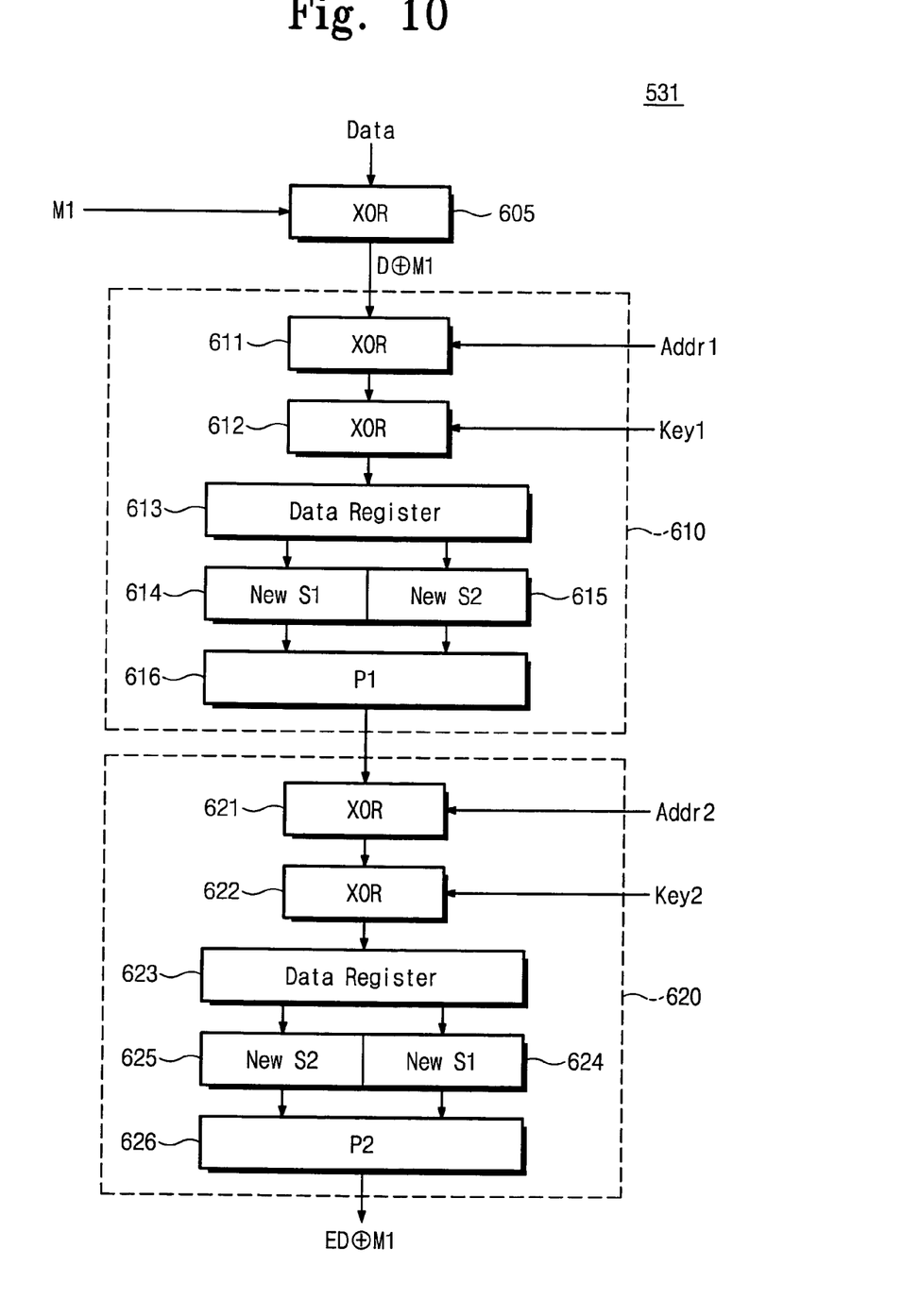
FIG. 10 is a block diagram that illustrates encryption logic circuitry for use in the cryptographic system of FIG. 9, in accordance with some embodiments of the present invention.

Referring to FIG. 10, encryption logic circuitry that may be used in the encryption circuits 531 and/or 532 of FIG. 9, in accordance with some embodiments of the present invention, will be described. For purposes of illustration, the encryption logic circuitry of FIG. 10 will be described with respect to an implementation of the encryption circuit 531. The first and second round logic circuits 610 and 620 are substantially the same as the first and second round logic circuits 210 and 220 discussed above with respect to FIG. 3. The sub-components of the first and second round logic circuits 610 and 620 are numbered in corresponding fashion to the sub-components of the first and second round logic circuits 210 and 220. In contrast to the encryption logic circuitry of FIG. 3, however, the S-box circuits 614, 615, 624, and 625 are different from the corresponding S-box circuits of FIG. 3. This is because the input to the first round logic circuit 610 is not merely input data, but is input data on which the XOR logic circuit 605 has applied a mask operation using the pattern MASK1 (M1).

A goal is to generate at the output of the encryption circuit 531 encrypted data XOR M1. This allows the pattern MASK1 (M1) to be removed by a simple XOR mask operation and then the decryption circuit 533 can decrypt the encrypted data using the encryption logic, including the S-box table of FIG. 4, to recover the original input data. To ensure that the output of the encryption circuit 531 is the encrypted data XOR M1, the new S1 circuit 614, 624 satisfies the following equation:

$$S1'(D\ XOR\ M1\ XOR\ A\ XOR\ K) = S1(D\ XOR\ A\ XOR\ K)\ XOR\ P^{-1}(M1);$$

where D is the input data, M1 is the first pattern, A is the at least a portion of the address (addr1), K is the key (key1), $P^{-1}$ is an inverse of the permutation performed by the permutation circuit 616, S1'( ) is the S1 transformation function, and S1( ) is another S-box transformation used in a decryption operation.

Similarly, the new S2 circuit 615, 625 satisfies the following equation:

$$S2'(D\ XOR\ M1\ XOR\ A\ XOR\ K) = S2(D\ XOR\ A\ XOR\ K)\ XOR\ P^{-1}(M1);$$

where D is the input data, M1 is the first pattern, A is the at least a portion of the address (addr1), K is the key (key1), $P^{-1}$ is an inverse of the permutation performed by the permutation circuit 616, S1'( ) is the S2 transformation function, and S20 is another S-box transformation used in a decryption operation.

If i=D XOR A1 XOR K1, then the foregoing equations for the new S1 circuit 614, 624 and the new S2 circuit 615, 625 can be written as follows:

$$S1'(i\ XOR\ M1) = S1(i)\ XOR\ P^{-1}(M1);\ \text{and}$$

$$S2'(i\ XOR\ M1) = S2(i)\ XOR\ P^{-1}(M1).$$

The output of the first round logic circuit 610 is given by the following equations:

$$P(S1'(i\ XOR\ M1) \| S2'(i\ XOR\ M1))$$

Which can be rewritten as follows:

$$P(S1(i)\ XOR\ P^{-1}(M1) \| S2(i)\ XOR\ P^{-1}(M1)) = P((S1(i) \| S2(i))\ XOR\ P^{-1}(M1))$$

Which can be rewritten as follows:

$$P(S1(i) \| S2(i))\ XOR\ P(P^{-1}(M1)) = P(S1(i) \| S2(i))\ XOR\ M1$$

Thus, the output of the first round logic circuit 610 is:

$$ED1\ XOR\ M1.$$

It will be appreciated that the functionality of any or all of the modules of the encryption circuit 131 and decryption circuit 132 of FIG. 2, the encryption circuit 131' and decryption circuit 132' of FIG. 6, the logic circuits 430, 440, and 450 of FIG. 7, the logic circuits 430', 440', and 450' of FIG. 8, and the encryption circuits 531, 532, decryption circuit 533, and error detection circuit 550 of FIG. 9 may be implemented using discrete hardware components, one or more application specific integrated circuits (ASICs), or a programmed digital signal processor or microcontroller. Computer code for carrying out operations of cryptographic systems and/or error detection circuits discussed above may be written in a high-level programming language, such as Java, C, and/or C++, for development convenience. In addition, computer code for carrying out operations of the present invention may also be written in other programming languages, such as, but not limited to, interpreted languages. Some modules or routines may be written in assembly language or even micro-code to enhance performance and/or memory usage.

In concluding the detailed description, it should be noted that many variations and modifications can be made to the embodiments without substantially departing from the principles of the present invention. All such variations and modifications are intended to be included herein within the scope of the present invention, as set forth in the following claims.

The invention claimed is:

1. A cryptographic system, comprising:
   encryption logic that is configured to encrypt input data by performing a mask operation on the input data using an address associated with the input data;
   wherein the encryption logic comprises:
   a first logic circuit that is configured to perform a first mask operation on the input data using at least a portion of an address so as to generate a first output;
   a second logic circuit that is configured to perform a second mask operation on the first output using a key to generate a second output, the key being independent of the address;
   an S-box circuit that is configured to transform the second output; and
   a permutation circuit is configured to permute the transformed second output so as to generate the encrypted input data;
   wherein the encryption logic is integrated with a central processing unit (CPU) so as to form a single unit.

2. The cryptographic system of claim 1, wherein each of the first and second mask operations comprise an exclusive OR operation, an addition operation, a subtraction operation, a multiplication operation, and/or a division operation, wherein the addition, subtraction, multiplication, and division operations are performed with respect to a modulus.

3. The cryptographic system of claim 1, wherein the permutation circuit is configured to perform a linear function on the transformed second output.

4. The cryptographic system of claim 3, wherein the linear function is a shift function or linear transformation of bits of the second output.

5. The cryptographic system of claim 1, wherein the input data comprises at least a byte of data, and wherein the S-box circuit comprises a first S-box circuit and a second S-box circuit that are configured to transform a first nibble of the second output and a second nibble of the second output, respectively.

6. The cryptographic system of claim 1, wherein the input data comprises at least a byte of data.

7. The cryptographic system of claim 1, further comprising:
   a processing unit;
   wherein the encryption logic comprises a cryptographic co-processor that is communicatively coupled to the processing unit, the cryptographic co-processor receiving the input data from the processing unit.

8. The cryptographic system of claim 1, further comprising:
   a processing unit;
   wherein the encryption logic is integrated with the processing unit so as to form a single logical unit.

9. The cryptographic system of claim 1, wherein the first logic circuit and the second logic circuit comprises a first round logic circuit, the S-box circuit comprises a first round S-box circuit, the permutation circuit comprises a first round permutation circuit, and the encrypted input data comprises first encrypted input data; and wherein the encryption logic further comprises:
   a second round logic circuit that is configured to generate a second round logic circuit output responsive to the first encrypted input data, at least a second portion of the address, and a second key;
   a second round S-box circuit that is configured to transform the second round logic circuit output; and
   a second round permutation circuit that is configured to permute the transformed second round logic circuit output so as to generate the second encrypted input data.

10. The cryptographic system of claim 9, wherein the input data comprises at least a byte of data, and wherein the first round S-box circuit comprises a first S-box circuit and a second S-box circuit that are configured to transform an upper bit nibble of the first round logic circuit output and a lower bit nibble of the first round logic circuit output, respectively, and wherein the second round S-box circuit comprises a third S-box circuit and a fourth S-box circuit corresponding to the first S-box circuit and the second S-box circuit, respectively, that are configured to transform a lower bit nibble of the second round logic circuit output and an upper bit nibble of the second round logic circuit output, respectively.

11. A method of operating a cryptographic system, comprising:
  encrypting input data using encryption logic integrated with a central processing unit (CPU) so as to form a single unit by performing a mask operation on the input data using an address associated with the input data;
  wherein encrypting the input data comprises:
  performing a first mask operation on the input data using at least a portion of an address so as to generate a first output;
  performing a second mask operation on the first output using a key to generate a second output, the key being independent of the address;
  transforming the second output using an S-box circuit; and
  permuting the transformed second output so as to generate the encrypted input data.

12. The method of claim 11, wherein each of the first and second mask operations comprise an exclusive OR operation, an addition operation, a subtraction operation, a multiplication operation, and/or a division operation, wherein the addition, subtraction, multiplication, and division operations are performed with respect to a modulus.

13. A computer program product comprising computer-readable program code embodied on a non-transitory computer-readable medium, the computer readable program code being configured to carry out the method of claim 11.

* * * * *